(12) United States Patent
Bono

(10) Patent No.: US 8,014,949 B2
(45) Date of Patent: Sep. 6, 2011

(54) MOBILE BODY

(75) Inventor: Tetsuya Bono, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 546 days.

(21) Appl. No.: 11/884,013

(22) PCT Filed: Feb. 20, 2006

(86) PCT No.: PCT/JP2006/313791
§ 371 (c)(1),
(2), (4) Date: Aug. 9, 2007

(87) PCT Pub. No.: WO2007/018010
PCT Pub. Date: Feb. 15, 2007

(65) Prior Publication Data
US 2008/0300729 A1 Dec. 4, 2008

(30) Foreign Application Priority Data
Aug. 11, 2005 (JP) ................. 2005-233170

(51) Int. Cl.
*G05D 1/02* (2006.01)
*G05D 1/00* (2006.01)
(52) U.S. Cl. ............... 701/300; 701/1; 701/22
(58) Field of Classification Search ............... 701/1, 200, 701/206–208, 213, 300, 22; 340/901, 905, 340/988, 995.1, 995.13, 995.14, 995.18, 995.24, 995.27
See application file for complete search history.

(56) References Cited

U.S. PATENT DOCUMENTS
2008/0269971 A1* 10/2008 Fernandez ................. 701/22

FOREIGN PATENT DOCUMENTS

| JP | 2002-142305 A | 5/2002 |
|---|---|---|
| JP | 2002-352824 A | 12/2002 |
| JP | 2002-352824 A | 12/2002 |
| JP | 2003-017094 A | 1/2003 |
| JP | 2003-063373 A | 3/2003 |
| JP | 2003-77484 A | 3/2003 |
| JP | 2003-149071 A | 5/2003 |
| JP | 2005-93185 A | 4/2005 |
| JP | 2005-197156 A | 7/2005 |

* cited by examiner

*Primary Examiner* — Hussein A. Elchanti
(74) *Attorney, Agent, or Firm* — Kenyon & Kenyon LLP

(57) ABSTRACT

A disclosed mobile body includes an energy generator configured to generate energy from a supplied fuel gas; a gas leakage detecting unit configured to detect leakage of the fuel gas out of the energy generator; a control unit configured to control power output of the energy generator; an information obtaining unit configured to obtain environmental information on an environment around the mobile body from a predetermined information source; and a power-control-manner determining unit configured to determine a power-control manner, in which the control unit controls the power output of the energy generator, based on the environmental information on the environment around the mobile body when leakage of the fuel gas is detected by the gas leakage detecting unit.

13 Claims, 6 Drawing Sheets

MOBILE BODY

This is a 371 national phase application of PCT/JP2006/313791 filed 11 Jul. 2006, claiming priority to Japanese Patent Application No. 2005-233170 filed 11 Aug. 2005, the contents of which are incorporated herein by reference.

TECHNICAL FIELD

The present invention generally relates to a mobile body including an energy generator, such as a fuel cell, that uses a fuel gas, and more particularly relates to a control unit for controlling an energy generator of a mobile body.

BACKGROUND ART

A fuel-cell electric vehicle includes a fuel cell that generates electricity from air and a fuel mainly made of hydrogen, an air supplying device for supplying air to the fuel cell, a fuel supplying device for supplying a fuel such as hydrogen to the fuel cell, and a motor for converting electricity into driving power. Such a fuel-cell electric vehicle normally employs a hybrid configuration where both a fuel cell and a secondary battery are provided. For fuel cell systems of electric vehicles, polymer electrolyte fuel cells are mainly used.

As described above, a fuel cell uses a fuel gas such as hydrogen. Since hydrogen has a small molecular weight, it is difficult to completely seal a fuel cell system to prevent leakage of hydrogen. To cope with this problem, a method of detecting leakage of hydrogen gas at an early stage with a hydrogen sensor in a vehicle has been proposed (see patent document 1). Patent document 1 also discloses a method of preventing malfunction of a hydrogen sensor by improving its detection accuracy.

[Patent document 1] Japanese Patent Application Publication No. 2002-352824

DISCLOSURE OF INVENTION

Problems to be Solved by the Invention

According to the technology disclosed in patent document 1, a fuel cell system is stopped immediately when leakage of hydrogen from the fuel cell system is detected while the vehicle is moving. However, forcing a vehicle to stop immediately without taking into account the position of the vehicle and/or the driving environment (such as topography and traffic volume) around the vehicle may obstruct traffic and may even increase the danger. Also, it is not desirable to stop a gas-leaking vehicle in an enclosed space such as an underground parking lot or a tunnel.

The present invention provides a mobile body that substantially obviates one or more problems caused by the limitations and disadvantages of the related art. One object of the present invention is to provide a mobile body, such as a vehicle, including an energy generator such as a fuel cell that uses a fuel gas and a control unit that can appropriately control the energy generator according to the position of the mobile body and/or driving environment around the mobile body when leakage of the fuel gas occurs.

Means for Solving the Problems

To achieve an object of the present invention, a mobile body includes an energy generator configured to generate energy from a supplied fuel gas; a gas leakage detecting unit configured to detect leakage of the fuel gas out of the energy generator; a control unit configured to control power output of the energy generator; an information obtaining unit configured to obtain environmental information on an environment around the mobile body from a predetermined information source; and a power-control-manner determining unit configured to determine a power-control manner, in which the control unit controls the power output of the energy generator, based on the environmental information on the environment around the mobile body when leakage of the fuel gas is detected by the gas leakage detecting unit.

The environmental information on the environment around the mobile body may include information on a position of the mobile body and/or information on an environment around the position of the mobile body.

The above configuration makes it possible to prevent a mobile body leaking a fuel gas from being forcibly stopped in an inappropriate place.

The power-control-manner determining unit of the mobile body according to the present invention may include a unit configured to determine a power-control-prohibited place based on the environmental information and may be configured to limit or prevent control of the power output of the energy generator by the control unit if leakage of the fuel gas is detected by the gas leakage detecting unit when the mobile body is running in the power-control-prohibited place.

The power-control-manner determining unit of the mobile body according to the present invention may include a unit configured to determine a power-control-prohibited place based on the environmental information and may be configured to determine the power-control manner, in which the control unit controls the power output of the energy generator, based on the distance between the power-control-prohibited place and the mobile body when leakage of the fuel gas is detected by the gas leakage detecting unit.

The power-control-manner determining unit of the mobile body according to the present invention may include a unit configured to determine a power-control-prohibited place based on the environmental information. If leakage of the fuel gas is detected by the gas leakage detecting unit when the mobile body is running in or approaching the power-control-prohibited place, the power-control-manner determining unit limits or prevents control of the power output of the energy generator by the control unit until the mobile body leaves the power-control-prohibited place.

These configurations make it possible to more effectively prevent a mobile body leaking a fuel gas from being forcibly stopped in an inappropriate place.

The power-control-manner determining unit may be configured to determine the power-control manner, in which the control unit controls the power output of the energy generator, based on a gas leakage indicator of the fuel gas detected by the gas leakage detecting unit in addition to the information on the position of the mobile body and the information on the environment around the position of the mobile body.

The power-control-manner determining unit of the mobile body according to the present invention may include a unit configured to determine a power-control-prohibited place based on the environmental information and may be configured to determine the power-control manner, in which the control unit controls the power output of the energy generator, based on a threshold level of the gas leakage indicator, which threshold level changes according to a distance between the power-control-prohibited place and the mobile body, when leakage of the fuel gas is detected by the gas leakage detecting unit.

The environmental information on the environment around the mobile body may be information indicating whether the environment is an enclosed space where gas ventilation is poor or information indicating topography of the environment.

When the mobile body is a vehicle, the environmental information on the environment around the mobile body may be traffic congestion information.

Also, when the mobile body is a vehicle, the power-control-prohibited place determined based on the environmental information may be a tunnel or an underground parking lot.

Further, when the mobile body is a vehicle, the power-control-prohibited place determined based on the environmental information may be an intersection or a road where a traffic volume is equal to or greater than a predetermined level.

Controlling an energy generator of a mobile body as described above when leakage of a fuel gas occurs makes it possible to prevent the mobile body from being forcibly stopped in an enclosed space such as a tunnel or an underground parking lot, or to prevent the mobile body from being forcibly stopped in a place with heavy traffic such as an intersection and from obstructing traffic of other mobile bodies.

The mobile body according to the present invention may be configured to report a system error to the driver by voice or by displaying a message when the concentration of the fuel gas detected by the gas leakage detecting unit exceeds a reference level. Such a system error report enables the driver to appropriately drive the mobile body and to take appropriate actions.

According to the present invention, the environmental information may be obtained from map information in a navigation system or via communication with an external source.

Thus, the mobile body according to the present invention makes it possible to appropriately control the power output of an energy generator, when a problem causing leakage of a fuel gas from the energy generator occurs, according to the status of the problem, the location of the mobile body, and/or the environment around the mobile body.

The mobile body according to the present invention may also be configured to be driven by a second energy generator when the power output of the energy generator is reduced or the energy generator is stopped.

Advantageous Effect of the Invention

A mobile body according to the present invention makes it possible to appropriately control the power output of an energy generator according to the position of the mobile body and/or the driving environment around the mobile body when leakage of a fuel gas from the energy generator occurs.

EXPLANATION OF REFERENCES

Figure 1:
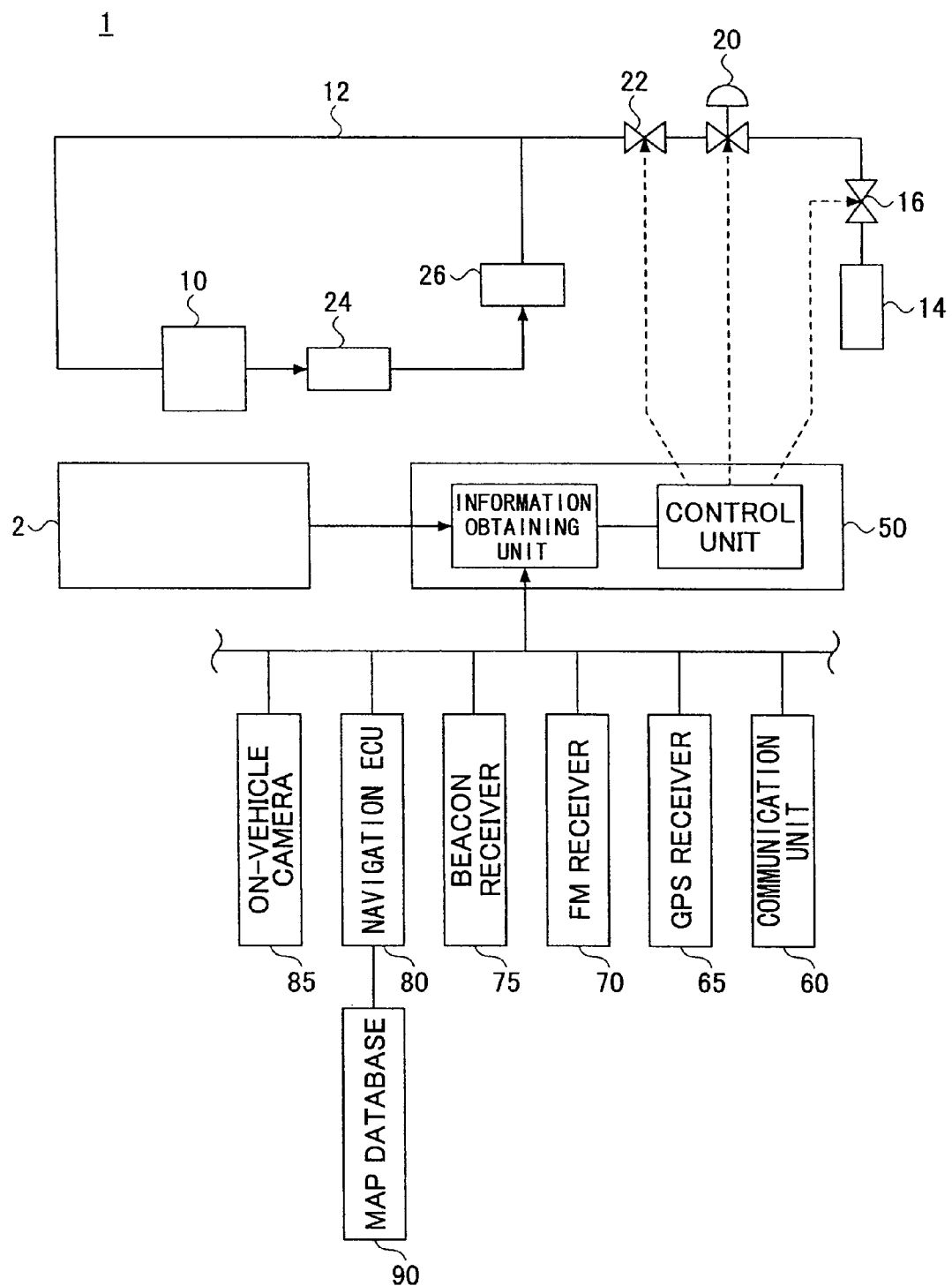
FIG. 1 is a schematic diagram of a control unit and a power-control-manner determining unit of a fuel cell system.

1 Fuel cell system
2 Gas leakage detecting unit
10 Fuel cell
12 Fuel gas supply pipe
14 Fuel storage tank
16 Fuel supply shutoff valve
20 Pressure regulator
22 On-off valve
24 Water recovery unit
26 Recirculation unit
28 Check valve
50 FC-ECU

BEST MODE FOR CARRYING OUT THE INVENTION

The best mode for carrying out the invention is described based on the following embodiments.

In the present application, a fuel gas indicates, for example, hydrogen, CNG, or LPG, and an energy generator indicates a system including a fuel cell that generates electric energy from, for example, hydrogen and an internal combustion engine that generates mechanical energy (driving power) by burning a fuel gas. An energy generator may also be defined to include a gas storage unit (high-pressure tank) for storing a fuel gas, a gas pipe for supplying a fuel gas to a fuel cell or an internal combustion engine, and other components such as a valve, a sensor, a pump, and a control unit.

Examples of mobile bodies include a vehicle, an airplane, a ship, and a robot. The embodiments below are described taking a vehicle as an example. More specifically, the embodiments are described using a vehicle including a fuel cell system as an energy generator.

FIG. 1 is a drawing illustrating an exemplary configuration of a fuel cell system 1. As shown in FIG. 1, the fuel cell system 1 is controlled mainly by an electronic control unit 50 (hereafter called an FC-ECU 50). The FC-ECU 50 is composed of a microcomputer including a CPU, a ROM, and a RAM that are connected to each other via a bus (not shown).

In the fuel cell system 1 shown in FIG. 1, a fuel cell 10 is connected to a fuel gas supply pipe 12. A fuel gas is supplied from a fuel (hydrogen) storage tank 14 via the fuel gas supply pipe 12 to the fuel cell 10. When a fuel supply shutoff valve 16 is opened, a fuel gas flows into a pressure regulator 20 from the fuel storage tank 14. The pressure regulator 20 reduces the pressure of the fuel gas so that the fuel gas is supplied at a suitable pressure to an on-off valve 22 situated downstream of the pressure regulator 20. The pressure-reduced fuel gas supplied to the on-off valve 22 is adjusted to a predetermined volume there and then supplied to the fuel cell 10. A remnant of the fuel gas not consumed in the fuel cell 10 flows into a water recovery unit 24 where water is removed from the remnant fuel gas. The remnant fuel gas is then supplied again to the fuel cell 10 normally via a recirculation unit 26. A pipe for supplying air and a pipe for supplying cooling water are also connected to a fuel cell. However, since such a configuration is well known, descriptions of those pipes are omitted here.

The FC-ECU 50 is connected to a gas leakage detecting unit 2 for detecting leakage of a fuel gas used in the fuel cell system 1. The gas leakage detecting unit(s) 2 is provided, for example, in a compartment where a fuel cell stack is installed, under a passenger compartment, on a ceiling, and/or in an exhaust chamber.

The gas leakage detecting unit may be configured to detect a fuel gas leaking out of an energy generator of a fuel cell system (for example, through joints or cracks in piping and sealant) and the concentration of the fuel gas using external gas sensors. Also, the gas leakage detecting unit may be configured to detect leakage of a fuel gas based on a pressure change or a change in gas flow rate in a space (for example, a fuel cell or a gas pipe connected to a fuel cell) where the fuel gas is contained.

The FC-ECU 50 reduces the power output of the fuel cell system 1 or stops the fuel cell system 1 as described later when leakage of a fuel gas occurs. The power output of a fuel cell is normally controlled by changing the amount of a reactant gas supplied to the fuel cell. The FC-ECU 50 controls the power output of the fuel cell system 1 by opening or closing the pressure regulator 20 and the on-off valve 22. When stopping the fuel cell system 1 in an emergency, the FC-ECU 50 closes the fuel supply shutoff valve 16.

The FC-ECU 50 is connected via a bus such as a controller area network (CAN) to various electronic components (for example, sensors such as a speed sensor, an accelerator-opening-degree sensor, and a brake pedal force sensor, and ECUs) in the vehicle. The FC-ECU 50 obtains vehicle position information and environmental information by communicating with those electronic components.

In the example shown in FIG. 1, the FC-ECU 50 is connected to a navigation ECU for controlling an in-vehicle navigation system. The FC/ECU 50 obtains information on power-control-prohibited places (described later) as a part of the vehicle position information and environmental information through communication with the navigation ECU.

A map database is connected to the navigation ECU. Map data contained in the map database include information similar to that of a typical in-vehicle navigation system. For example, the map data include road information such as coordinates of nodes corresponding to intersections, information on links connecting adjacent nodes, widths of roads corresponding to the links, types of the roads, such as national roads, prefectural roads, and expressways corresponding to the links, and traffic regulations on and between the links.

The map database of this embodiment also contains information (hereafter called power-control-prohibited place information) on power-control-prohibited places (for example, positions of tunnels as described later). The details of power-control-prohibited place information are described later. The power-control-prohibited place information may be included in the map database beforehand where possible, or may be added afterward to the map database, for example, based on data (such as images taken by a camera) obtained during driving.

The navigation ECU includes a vehicle position detecting unit that generates vehicle position information. The vehicle position detecting unit includes a global positioning system (GPS) receiver, a beacon receiver, an FM multiplex broadcast receiver, and sensors such as a speed sensor and a gyro sensor. For example, the GPS receiver receives satellite signals via a GPS antenna from GPS satellites. The vehicle position detecting unit obtains the current position of a vehicle by carrier phase measurement based on the phase integrated value of the received satellite signals.

When leakage of a fuel gas is detected by the gas leakage detecting unit 2, the FC-ECU 50 determines whether any power-control-prohibited place is present in an area ahead of the vehicle in the moving direction of the vehicle based on vehicle position information and environmental information obtained from the vehicle position detecting unit.

A power-control-prohibited place indicates a place where stopping or slowing down a vehicle by reducing the power output of the fuel cell system 1 may cause a problem. Examples of power-control-prohibited places include not only enclosed spaces such as a tunnel and an underground parking lot where gas ventilation is poor but also places such as a railroad crossing and an intersection that are not suitable for stopping a vehicle. Further, power-control-prohibited places may include places such as a heavy traffic area where stopping or slowing down a vehicle may cause trouble for other vehicles. Power-control-prohibited places such as tunnels whose locations do not change very often may be included in the map database beforehand. On the other hand, power-control-prohibited places such as heavy traffic areas that change constantly may be determined based on environmental information obtained via wireless communication from external sources. For example, environmental information may be obtained from beacons, by road-to-vehicle communication with FM multiplex broadcasting stations, by vehicle-to-vehicle communication with other vehicles, or from information service centers. Also, power-control-prohibited places may be determined using images taken by an on-vehicle camera instead of or in addition to the above measures.

The FC-ECU 50 of this embodiment, even when leakage of a fuel gas is detected by the gas leakage detecting unit 2, refrains from or limits the degree of reducing the power output of the fuel cell system 1 if the vehicle is in or near a power-control-prohibited place and if reducing the power output of the fuel cell system 1 is likely to cause the vehicle to stop in the power-control-prohibited place.

Normally, a control unit of a conventional fuel cell system stops the fuel cell system immediately and thereby stops the vehicle when leakage of a fuel gas is detected. However, under certain driving environments or conditions, it may not be appropriate to immediately stop a vehicle even if leakage of a fuel gas is detected. In many cases, a vehicle can continue to run even if leakage of a fuel gas occurs. In such cases, it is preferable to stop the vehicle after moving it to a safe place.

Embodiments of the present invention make it possible to determine a power-control manner of controlling the power output of a fuel cell system based on the position of a vehicle and driving environment around the vehicle when leakage of a fuel gas occurs and thereby to appropriately control the power output of the fuel cell system to prevent the vehicle from being stopped in an inappropriate place.

This mechanism is described below in detail.

Figure 2:
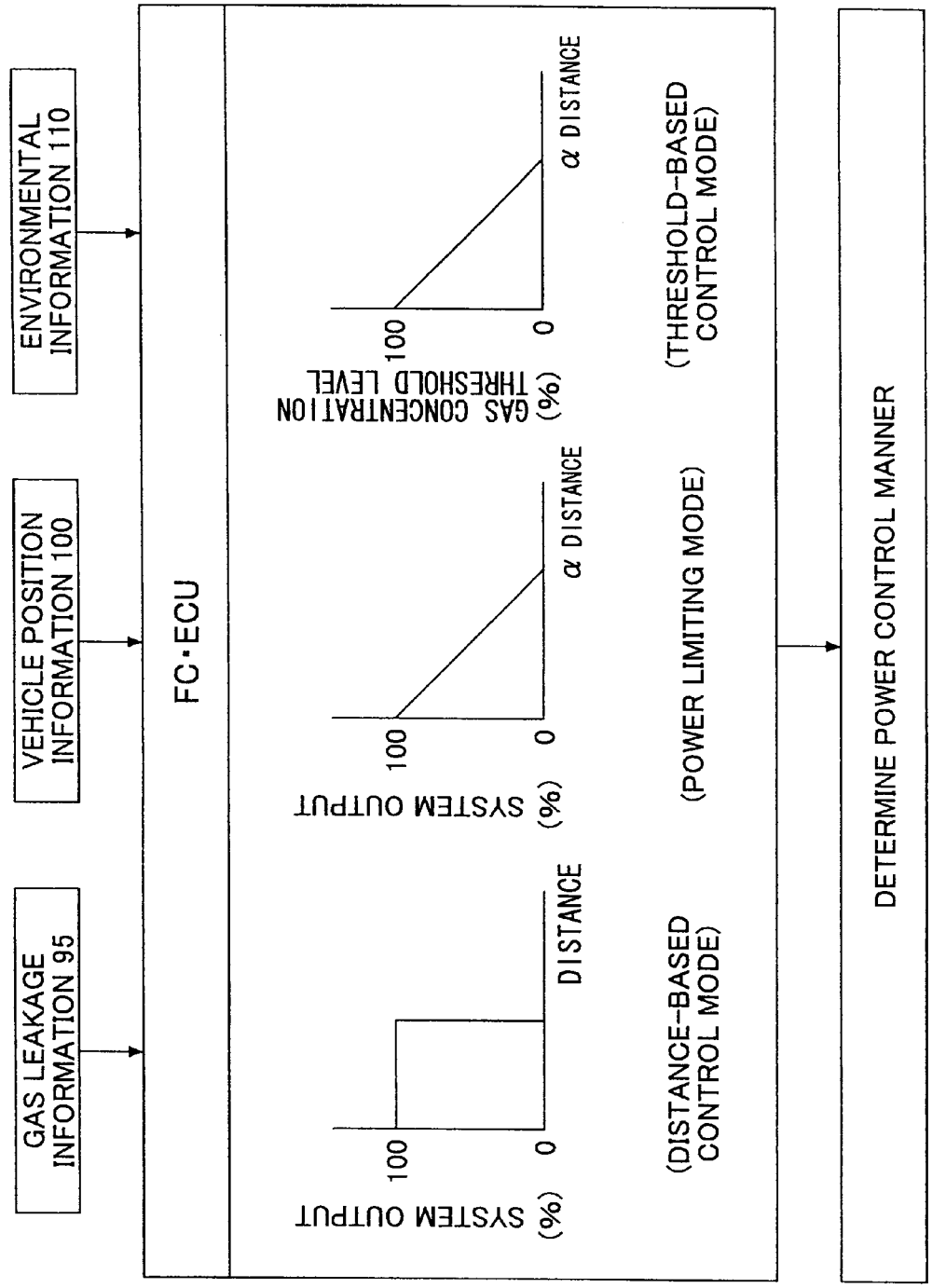
FIG. 2 is a drawing illustrating control modes of an ECU of a power-control-manner determining unit.

FIG. 2 shows the outline of a process performed by the FC-ECU 50. When the concentration of leaked fuel gas detected by the gas leakage detecting unit 2 exceeds a reference level, the FC-ECU 50 determines whether to immediately stop the fuel cell system based on the distance from a predetermined power-control-prohibited place such as a tunnel (distance-based control mode). Alternatively, the FC-ECU 50 may be configured to change the power output of the fuel cell system gradually within a range between 100% and 0% (emergency stop) based on the distance between a vehicle and a power-control-prohibited place (power limiting mode). As another alternative, the FC-ECU 50 may be configured to determine whether to immediately stop the fuel cell system by comparing the concentration of leaked fuel gas detected by the gas leakage detecting unit 2 with a predetermined fuel gas threshold level that changes as the distance between a vehicle and a power-control-prohibited place changes (threshold-based control mode). Further, the FC-ECU 50 may be configured to control the power output of the fuel cell system based on a combination of the power limiting mode and the threshold-based control mode. Based on the decision, the FC-ECU 50 controls a power control unit (PCU) and/or the fuel supply shutoff valve 16 and thereby controls the power output of the fuel cell system.

Figure 3:
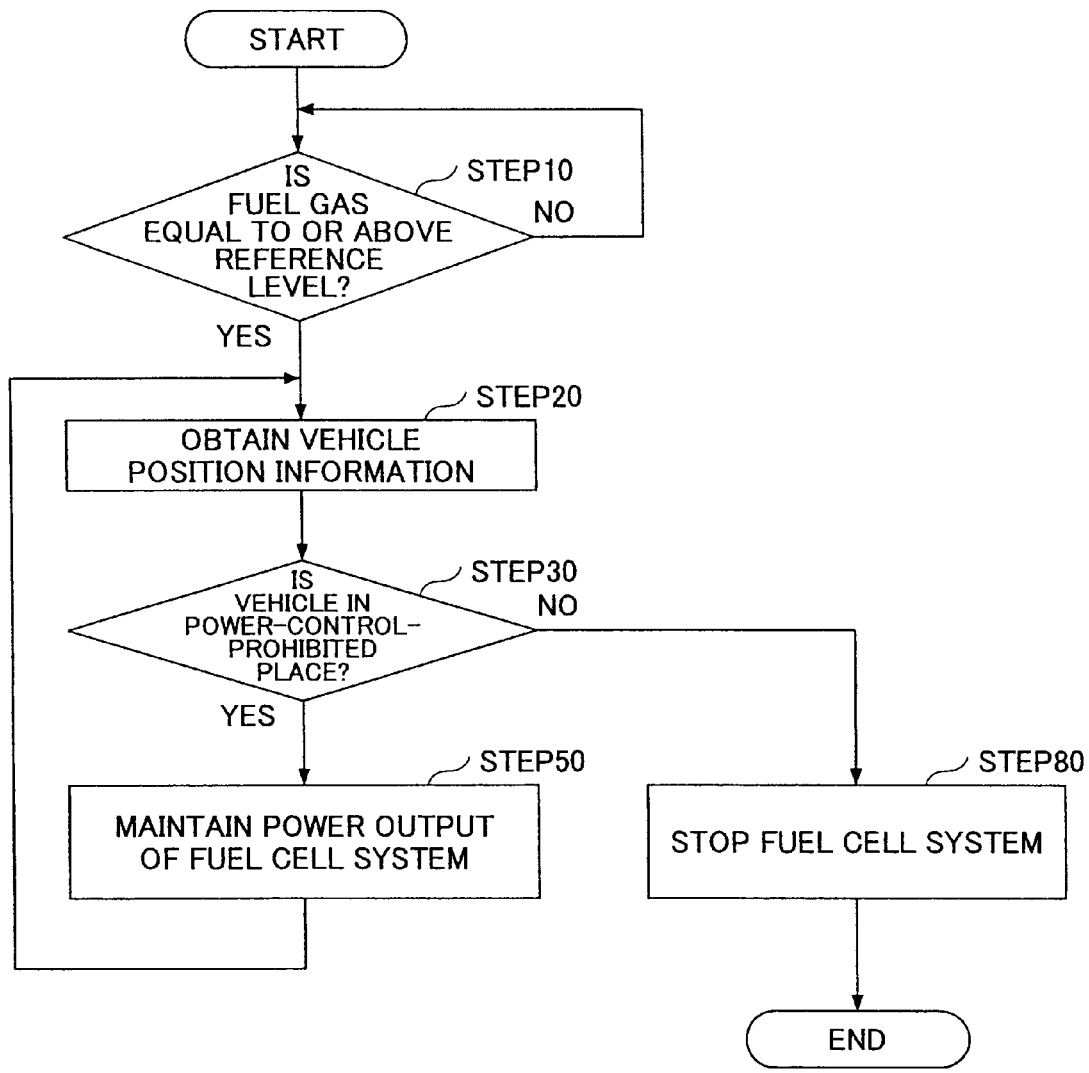
FIG. 3 is a flowchart showing a first embodiment of the present invention.

A first embodiment of the present invention is described below with reference to the flowchart shown in FIG. 3. In the first embodiment, the fuel cell system is controlled based on the distance-based control mode shown in FIG. 2. In step 10, the gas leakage detecting unit 2 determines whether a fuel gas is leaking. More specifically, the gas leakage detecting unit 2 determines that the fuel gas is leaking if the concentration of the leaking fuel gas is equal to or above a reference level. Accordingly, if the concentration of the fuel gas is below the reference level, subsequent steps are not performed.

If the concentration of the fuel gas is equal to or above the reference level, the FC-ECU 50 obtains information on the position of the vehicle and the environment around the vehicle in step 20. In step 30, the FC-ECU 50 determines whether the vehicle is running in a power-control-prohibited place (for example, a tunnel). If the vehicle is running in a power-control-prohibited place, the FC-ECU 50 does not stop the fuel cell system but allows the fuel cell system to keep running in step 50. Steps 20, 30, and 50 are repeated until the vehicle leaves the power-control-prohibited place. When it is determined that the vehicle is out of the power-control-prohibited place in step 30, the FC-ECU 50 closes the fuel supply shutoff valve 16 and thereby stops the fuel cell system in step 80. After the fuel cell system is stopped, the vehicle is driven, for example, by a second energy generator such as a secondary battery as in a conventional method until it reaches a safe place such as a road shoulder and is then stopped.

Controlling a fuel cell system as described above when fuel gas leakage occurs makes it possible, for example, to prevent a vehicle from being stopped in an enclosed space such as a tunnel or to prevent a vehicle from being stopped in an intersection and obstructing the traffic of other vehicles.

In the above embodiment, the FC-ECU 50 determines, in step 30, whether to stop a fuel cell system based on whether a vehicle is running in a power-control-prohibited place. Alternatively, the FC-ECU 50 may be configured to control a fuel cell system as described above when a vehicle is running in or approaching a power-control-prohibited place. This method makes it possible to more effectively prevent a vehicle from being stopped in a power-control-prohibited place.

Figure 4:
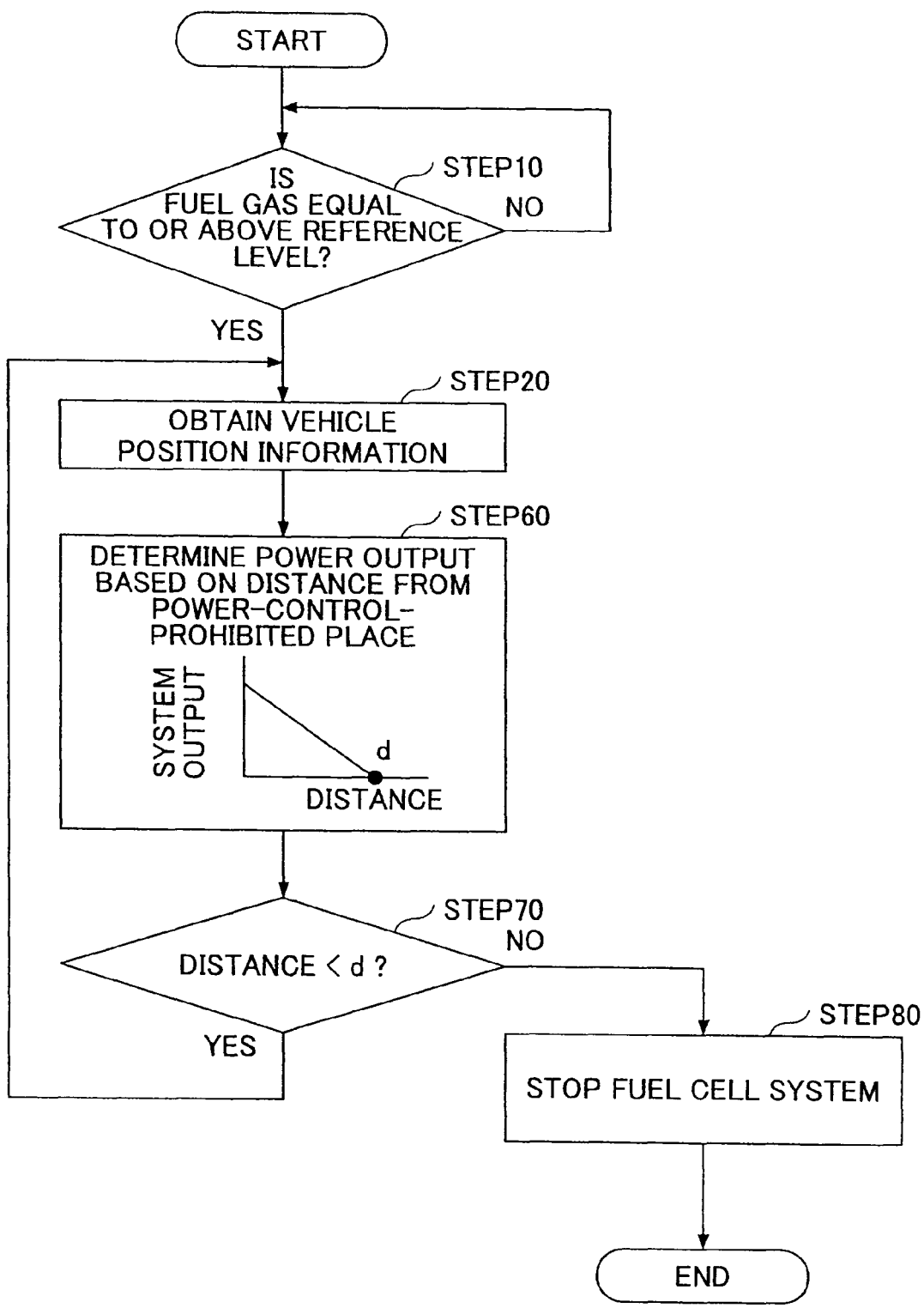
FIG. 4 is a flowchart showing a second embodiment of the present invention.

A process of controlling a fuel cell system by a control unit according to a second embodiment of the present invention is described below with reference to the flowchart shown in FIG. 4. In the second embodiment, the fuel cell system is controlled based on the power limiting mode shown in FIG. 2. Steps 10 and 20 of determining fuel gas leakage and obtaining information in the second embodiment are substantially the same as the corresponding steps in the first embodiment. In step 60 of the second embodiment, the FC-ECU 50 determines the power output of the fuel cell system based on the distance between a power-control-prohibited place and the vehicle obtained in step 20 and a predetermined relationship between the distance and the power output of the fuel cell system. Then, according to the determined power output, the FC-ECU 50 controls the PCU and/or the fuel supply shutoff valve 16 and thereby controls the fuel cell system. The steps of obtaining information and controlling the power output of the fuel cell system are repeated until the distance between the power-control-prohibited place and the vehicle reaches a predetermined value "d". When the distance between the power-control-prohibited place and the vehicle is equal to or larger than the predetermined value in step 70, the FC-ECU 50 closes the fuel supply shutoff valve 16 and thereby stops the fuel cell system. For example, as shown in table 1 below, when it is determined that a vehicle is running in a power-control-prohibited place, the power output of the fuel cell system is not reduced (power output: 100%). When it is determined that a vehicle is 500 m away from a power-control-prohibited place, the power output is reduced to 50%. When a vehicle is 1000 m or more away from a power-control-prohibited place, the fuel cell system is stopped.

TABLE 1

| | Distance from power-control-prohibited place (m) | | |
|---|---|---|---|
| | 0 | 500 | 1000 |
| Power output of fuel cell system (%) | 100 | 50 | 0 |

When the power output of the fuel cell system is reduced, the driving energy corresponding to the reduced amount of power output is compensated for by a secondary battery.

Figure 5:
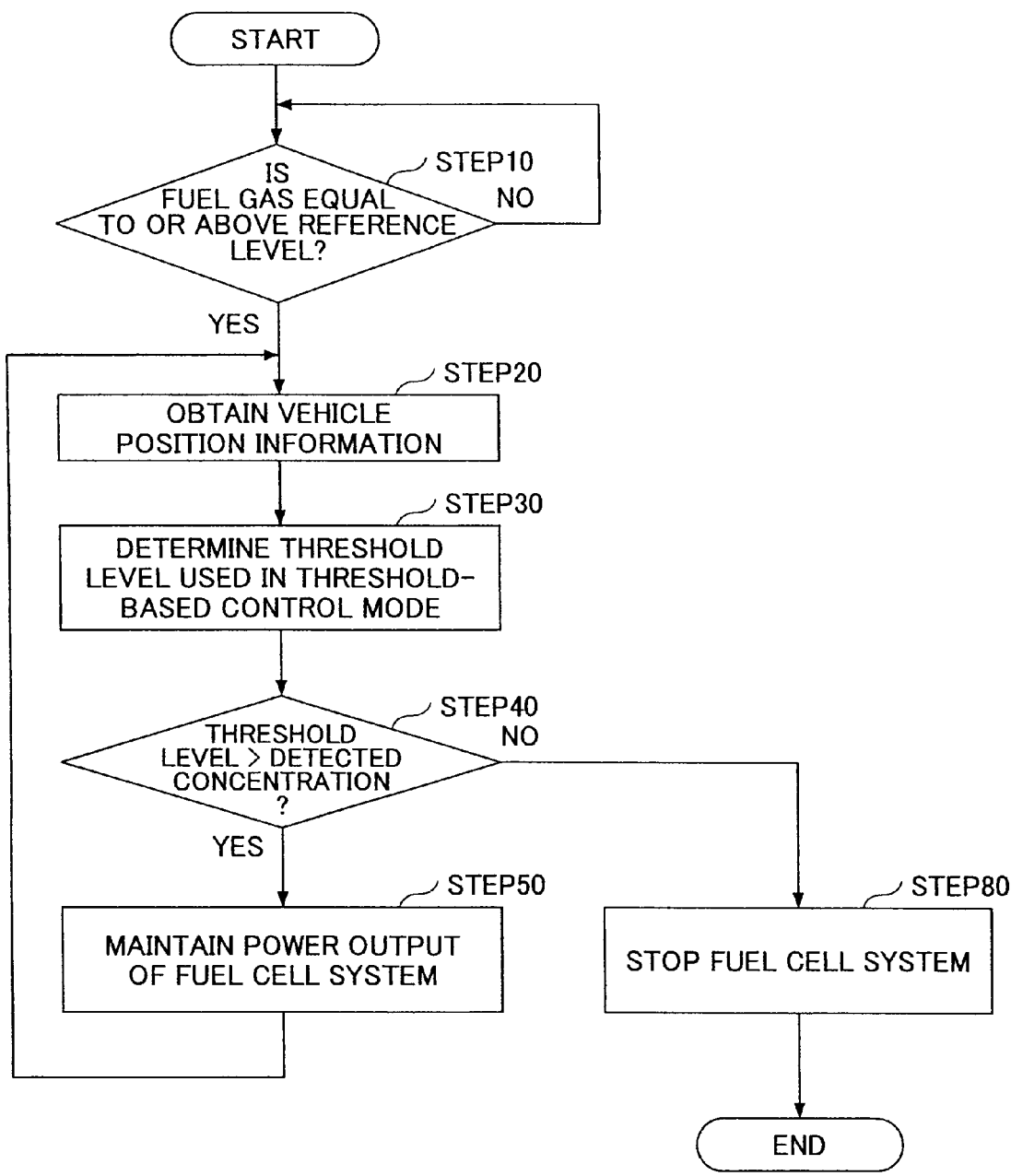
FIG. 5 is a flowchart showing a third embodiment of the present invention.

FIG. 5 shows a process of controlling a fuel cell system by a control unit according to a third embodiment of the present invention. In the third embodiment, the fuel cell system is controlled based on the threshold-based control mode shown in FIG. 2. In this embodiment, the FC-ECU 50 retrieves, in step 30, a predetermined fuel gas threshold level that changes as the distance between a vehicle and a power-control-prohibited place changes, and compares, in step 40, the fuel gas threshold level and the concentration of leaked fuel gas detected by the gas leakage detecting unit 2. When the concentration is below the threshold level, the power output level of the fuel cell system is maintained. When the concentration is equal to or above the threshold level, the fuel cell system is stopped.

TABLE 2

| | Distance from power-control-prohibited place (m) | | |
|---|---|---|---|
| | 0 | 500 | 1000 |
| Fuel gas concentration threshold level (%) | 20 | 4 | 3.5 |

For example, as shown in table 2, when it is determined that a vehicle is running in a power-control-prohibited place, the FC-ECU 50 does not stop the fuel cell system unless the fuel gas concentration reaches 20%. When a vehicle is 500 m away from a power-control-prohibited place and the fuel gas concentration threshold level is equal to or above, for example, 4%, the FC-ECU 50 stops the vehicle. When a vehicle is 1000 m or more away from a power-control-prohibited place and the fuel gas concentration threshold level is equal to or above, for example, 3.5%, the FC-ECU 50 stops the vehicle.

Thus, in this embodiment, the FC-ECU 50 determines whether to keep the fuel cell system running or to stop the fuel cell system based on a predetermined fuel gas threshold level that changes in relation to the distance from a power-control-prohibited place. Alternatively, the FC-ECU 50 may be configured to determine by itself how to control the power output of the fuel cell system based on the distance from a power-control-prohibited place and the fuel gas concentration detected by the gas leakage detecting unit.

Figure 6:
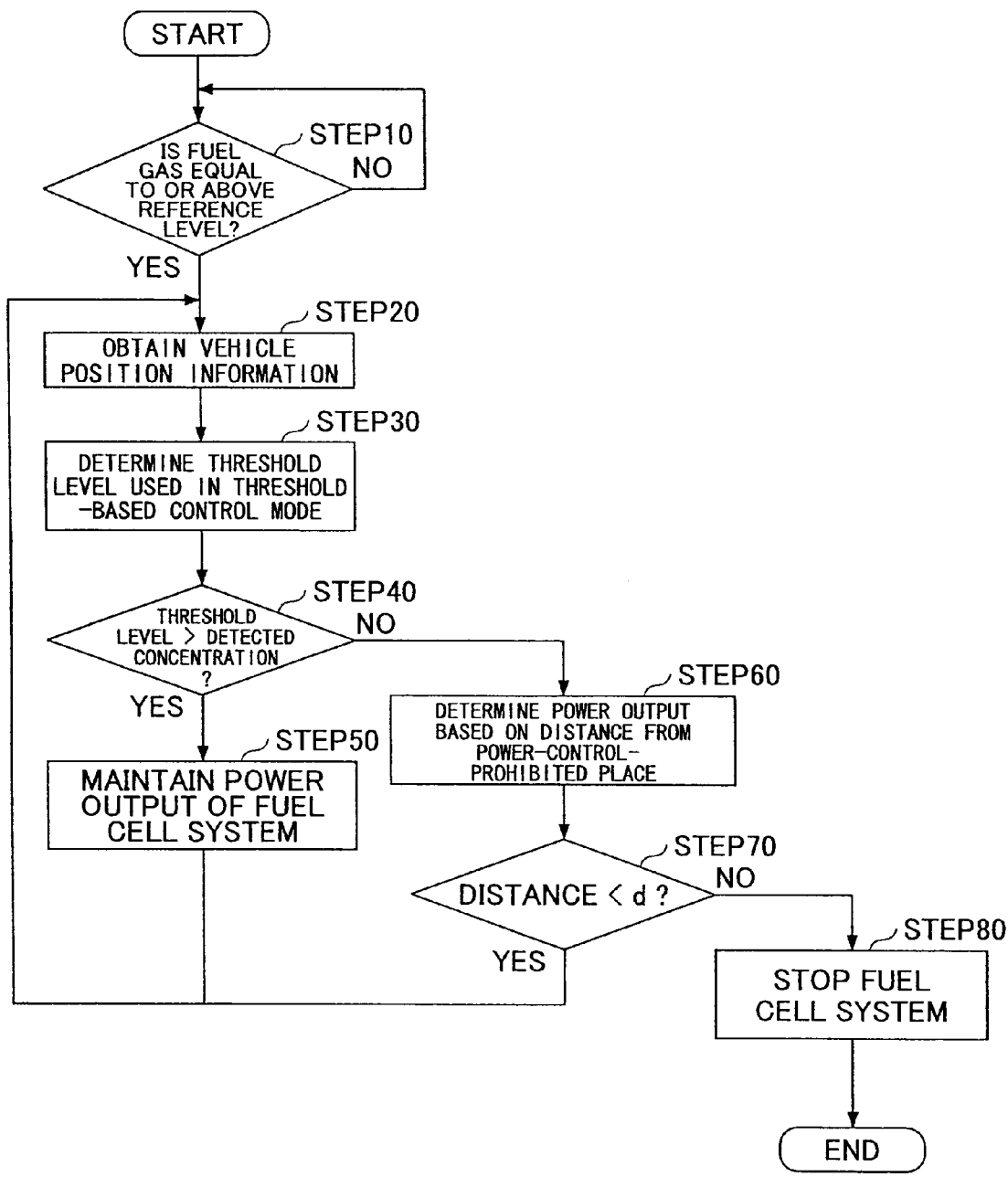
FIG. 6 is a flowchart showing a fourth embodiment of the present invention.

A process of controlling a fuel cell system by a control unit according to a fourth embodiment of the present invention is described below. The fourth embodiment is a combination of the second and third embodiments. According to the fourth embodiment, in step 30 shown in FIG. 6, the FC-ECU 50 retrieves a predetermined fuel gas threshold level that changes as the distance between a vehicle and a power-control-prohibited place changes. When concentration of leaked fuel gas detected by the gas leakage detecting unit 2 is below the threshold level, the power output level of the fuel cell system is maintained. When the fuel gas concentration is equal to or above the threshold level, the FC-ECU 50 determines the power output of the fuel cell system based on the distance from the power-control-prohibited place and controls the power output accordingly. When the distance from the power-control-prohibited place reaches or exceeds a predetermined value "d", the FC-ECU 50 stops the fuel cell system in step 80. Table 3 shows an exemplary control map used for this power output control.

TABLE 3

| Fuel cell system power output [%] | | Distance from power-control-prohibited place (m) | | | | |
|---|---|---|---|---|---|---|
| | | 0 | 200 | 400 | 600 | 1000 |
| Hydrogen concentration [%] | 3.0 | 100 | 100 | 100 | 60 | 20 |
| | 3.5 | 100 | 100 | 100 | 40 | 0 |
| | 4.0 | 100 | 100 | 100 | 20 | 0 |
| | 4.5 | 100 | 100 | 100 | 0 | 0 |
| | 5.0 | 100 | 100 | 80 | 0 | 0 |
| | 5.5 | 100 | 100 | 60 | 0 | 0 |
| | 6.0 | 100 | 100 | 40 | 0 | 0 |
| | 10.0 | 100 | 100 | 20 | 0 | 0 |

According to the second through fourth embodiments, the FC-ECU 50 determines the manner of controlling the fuel cell system using an additional parameter along with the distance from a power-control-prohibited place. Accordingly, the second through fourth embodiments make it possible to control the fuel cell system more effectively than the first embodiment. Needless to say, the values shown in tables 1 through 3 are examples and the relationship between distances and power output levels and/or the relationship between distances and threshold levels may be changed according to requirements. For example, in an area where successive tunnels, which are power-control-prohibited places, are present, the relationship between distances and power output levels and/or the relationship between distances and threshold levels (i.e. the gradient of power outputs and/or threshold levels with respect to distances) may be made steeper so that a vehicle can be appropriately stopped between the exit of a tunnel and the entrance of another tunnel.

In the above embodiments, when it is determined in step 20 that a vehicle is running in an enclosed space, the following voice message or text message may be output or displayed on, for example, a display in the vehicle to report the situation to the driver: "A problem is detected in the fuel cell system. The vehicle can continue running until it gets out of the tunnel (, the underground parking lot, or the intersection)." or "A problem is detected in the fuel cell system. Stop the vehicle after getting out of the tunnel (, the underground parking lot, or the intersection)."

Thus, a control unit of a fuel cell system according to the present invention can appropriately control the fuel cell system when a problem causing leakage of a fuel gas occurs in a fuel cell vehicle according to the status of the problem, the location of the vehicle, and/or the driving environment around the vehicle. In other words, embodiments of the present invention make it possible to prevent a vehicle leaking a fuel gas from being forcibly stopped in an enclosed space such as a tunnel or an underground parking lot or to prevent such a vehicle from being stopped in or near an intersection and obstructing the traffic of other vehicles.

In the above embodiments of the present invention, a vehicle equipped with a fuel cell system is used as an example for descriptive purpose. However, a control unit according to the present invention may be applied to different types of vehicles such as a gas engine vehicle including an energy generator that generates driving energy by burning a fuel gas.

When the power output of an energy generator is reduced, the driving energy corresponding to the reduced amount of power output may be compensated for by a secondary battery. In such a configuration, the ratio of power output of the energy generator to that of the secondary battery may be determined freely and may be changed according to the driving environment.

The present application claims priority from Japanese Patent Application No. 2005-233170 filed on Aug. 11, 2005, the entire contents of which are hereby incorporated herein by reference.

The invention claimed is:

1. A mobile body, comprising:
    an energy generator configured to generate energy from a supplied fuel gas;
    a gas leakage detecting unit configured to detect leakage of the fuel gas out of the energy generator;
    a control unit configured to control power output of the energy generator;
    an information obtaining unit configured to obtain environmental information on an environment around the mobile body from a predetermined information source;
    a power-control-manner determining unit configured to determine a power-control manner, in which the control unit controls the power output of the energy generator, based on the environmental information on the environment around the mobile body when leakage of the fuel gas is detected by the gas leakage detecting unit;
    the power-control-manner determining unit includes a unit configured to determine a power-control-prohibited place based on the environmental information, and
    the power-control-manner determining unit is configured to cause the control unit to allow the energy generator to keep running if leakage of the fuel gas is detected by the gas leakage detecting unit when the mobile body is running in the power-control-prohibited place, thereby allowing the mobile body to be powered by the energy generator until the mobile body exits the power-control-prohibited place.

2. The mobile body as claimed in claim 1, wherein the environmental information on the environment around the mobile body includes information on a position of the mobile body and/or information on an environment around the position of the mobile body.

3. The mobile body as claimed in claim 1, wherein the power-control-manner determining unit is configured to determine the power-control manner, in which the control unit controls the power output of the energy generator, based on a distance between the power-control-prohibited place and the mobile body when leakage of the fuel gas is detected by the gas leakage detecting unit.

4. The mobile body as claimed in claim 1, wherein if leakage of the fuel gas is detected by the gas leakage detecting unit when the mobile body is running in or approaching the power-control-prohibited place, the power-control-manner determining unit limits or prevents control of the power output of the energy generator by the control unit until the mobile body leaves the power-control-prohibited place.

5. The mobile body as claimed in claim 2, wherein the power-control-manner determining unit is configured to determine the power-control manner, in which the control unit controls the power output of the energy generator, based on a gas leakage indicator of the fuel gas detected by the gas leakage detecting unit in addition to the information on the position of the mobile body and the information on the environment around the position of the mobile body.

6. The mobile body as claimed in claim 5, wherein the power-control-manner determining unit is configured to determine the power-control manner, in which the control unit controls the power output of the energy generator, based on a threshold level of the gas leakage indicator, which threshold level changes according to a distance between the power-control-prohibited place and the mobile body, when leakage of the fuel gas is detected by the gas leakage detecting unit.

7. The mobile body as claimed in claim 1, wherein the environmental information on the environment around the mobile body is information indicating whether the environment is an enclosed space where gas ventilation is poor or information indicating topography of the environment.

8. The mobile body as claimed in claim 7, wherein the mobile body is a vehicle and the environmental information on the environment around the mobile body is traffic congestion information.

9. The mobile body as claimed in claim 1, wherein the mobile body is a vehicle and the power-control-prohibited place determined based on the environmental information is a tunnel or an underground parking lot.

10. The mobile body as claimed in claim 1, wherein the mobile body is a vehicle and the power-control-prohibited place determined based on the environmental information is an intersection or a road where a traffic volume is equal to or greater than a predetermined level.

11. The mobile body as claimed in claim 1, wherein the mobile body is configured to report a system error to a driver by voice or by displaying a message when a concentration of the fuel gas detected by the gas leakage detecting unit exceeds a reference level.

12. The mobile body as claimed in claim 1, wherein the environmental information is obtained from map information in a navigation system or via communication with an external source.

13. The mobile body as claimed in claim 1, wherein the mobile body is driven by a second energy generator when the power output of the energy generator is reduced or the energy generator is stopped.

* * * * *

UNITED STATES PATENT AND TRADEMARK OFFICE
CERTIFICATE OF CORRECTION

PATENT NO. : 8,014,949 B2  
APPLICATION NO. : 11/884013  
DATED : September 6, 2011  
INVENTOR(S) : Tetsuya Bono Page 1 of 1

It is certified that error appears in the above-identified patent and that said Letters Patent is hereby corrected as shown below:

In the Title Page, column 1: Replace "(22) PCT Filed: Feb. 20, 2006" with --(22) PCT Filed: July 11, 2006--.

| Column | Line |
|--------|------|
| 8 | 4-10 |

Replace Table 1 with the following:

TABLE 1

| Distance from power-control-prohibited place (m) | 0 | 500 | 1000 |
|---|---|---|---|
| Power output of fuel cell system (%) | 100 | 50 | 0 |

| Column | Line |
|--------|------|
| 8 | 30-37 |

Replace Table 2 with the following:

TABLE 2

| Distance from power-control-prohibited place (m) | 0 | 500 | 1000 |
|---|---|---|---|
| Fuel gas concentration threshold level (%) | 20 | 4 | 3.5 |

Signed and Sealed this

Thirteenth Day of March, 2012

David J. Kappos
*Director of the United States Patent and Trademark Office*